(12) United States Patent
Siemens et al.

(10) Patent No.: US 8,085,439 B2
(45) Date of Patent: Dec. 27, 2011

(54) METHOD AND DEVICE FOR PROCESSING A PRINT DATA FLOW FOR PRODUCING MULTICOLOR PRINTED IMAGES USING A HIGH PERFORMANCE PRINTING SYSTEM

(75) Inventors: Rüdiger Siemens, München (DE); Helmut Weiner, München (DE); Olga Kurmann, München (DE); Karl Kaufmann, Poing (DE)

(73) Assignee: Oce Printing Systems GmbH, Poing (DE)

( * ) Notice: Subject to any disclaimer, the term of this patent is extended or adjusted under 35 U.S.C. 154(b) by 677 days.

(21) Appl. No.: 12/280,507

(22) PCT Filed: Feb. 14, 2007

(86) PCT No.: PCT/EP2007/051435
§ 371 (c)(1),
(2), (4) Date: Aug. 22, 2008

(87) PCT Pub. No.: WO2007/096283
PCT Pub. Date: Aug. 30, 2007

(65) Prior Publication Data
US 2009/0225336 A1    Sep. 10, 2009

(30) Foreign Application Priority Data
Feb. 24, 2006  (DE) .................... 10 2006 008 768

(51) Int. Cl.
*H04N 1/40* (2006.01)
(52) U.S. Cl. .................... 358/3.15; 358/2.1; 358/517

(58) Field of Classification Search .................... 358/1.9, 358/2.1, 3.15, 3.24, 3.27, 1.17–1.18, 517, 358/500, 400; 382/199, 266–267
See application file for complete search history.

(56) References Cited

U.S. PATENT DOCUMENTS

| | | | |
|---|---|---|---|
| 5,313,570 A * | 5/1994 | Dermer et al. ................ | 345/589 |
| 5,581,667 A | 12/1996 | Bloomberg | |
| 5,666,543 A | 9/1997 | Gartland | |
| 5,667,543 A | 9/1997 | Brouwers | |
| 5,768,488 A | 6/1998 | Stone et al. | |
| 5,982,997 A | 11/1999 | Stone et al. | |

(Continued)

FOREIGN PATENT DOCUMENTS
CA    2 325 264    6/2001

(Continued)

OTHER PUBLICATIONS

Advanced Function Presentation—Programming Guide and Line Data Reference—Oct. 2000.

(Continued)

*Primary Examiner* — Thomas D Lee
*Assistant Examiner* — Stephen M Brinich
(74) *Attorney, Agent, or Firm* — Schiff Hardin LLP

(57) ABSTRACT

In a method/device for preparing a print data stream for generation of print images with at least two primary colors, the print data contained in an input print data stream are supplied to a processing stage as input print data. The input print data are processed with the processing stage wherein at least one raster image of a first primary color is generated. Trapping information is generated by use of the raster image. An output print data stream is generated that has the trapping information in addition to print data.

20 Claims, 10 Drawing Sheets

U.S. PATENT DOCUMENTS

| | | |
|---|---|---|
| 6,377,711 B1 | 4/2002 | Morgana |
| 6,441,914 B1 | 8/2002 | Barak et al. |
| 6,594,034 B1 | 7/2003 | Bloomquist et al. |
| 6,795,214 B2 | 9/2004 | Weinholz et al. |
| 6,813,042 B2 | 11/2004 | Hawksworth et al. |
| 7,038,805 B1 | 5/2006 | Wegener |
| 2003/0179394 A1 | 9/2003 | Lane et al. |
| 2004/0150853 A1 | 8/2004 | Stodersching et al. |
| 2004/0187081 A1 | 9/2004 | Petz |
| 2005/0119901 A1 | 6/2005 | Ulrich |
| 2005/0219631 A1 | 10/2005 | Accad et al. |
| 2008/0273212 A1* | 11/2008 | Takeishi .................. 358/1.9 |

FOREIGN PATENT DOCUMENTS

| | | |
|---|---|---|
| DE | 196 23 327 | 12/1997 |
| DE | 199 12 511 | 9/2000 |
| EP | 0 833 216 | 4/1998 |
| EP | 0 929 189 | 7/1999 |
| EP | 1 073 261 | 1/2001 |
| EP | 1 612 728 | 1/2006 |
| JP | P2004-262011 A | 9/2004 |
| JP | 2007089189 A * | 4/2007 |
| WO | WO 95/20796 | 8/1995 |
| WO | WO 99/12337 | 3/1999 |
| WO | WO 02/093353 | 11/2002 |
| WO | WO 03/065197 | 8/2003 |

OTHER PUBLICATIONS

Data Stream and Object Architectures—Intelligent Printer Data Stream Reference Nov. 2000.

Screening Technologies and Print Quality Goldmann et al—The World of Printers—Chapter 7 2002.

Data Stream and Object Architectures—Mixed Object Document Content Architecture Reference—Jan. 2004 IBM.

* cited by examiner

AFP-DS: | BD | BP | DATA | IO | OVERLAY1 | OVERLAY2 | OVERLAY3 | EP | ED |

Fig. 5a

PCL-DS: | BD | BP | DATA | IM | MACRO1 | MACRO2 | MACRO3 | EP | ED |

Fig. 5b

METHOD AND DEVICE FOR PROCESSING A PRINT DATA FLOW FOR PRODUCING MULTICOLOR PRINTED IMAGES USING A HIGH PERFORMANCE PRINTING SYSTEM

BACKGROUND

The preferred embodiment concerns methods and devices for processing a print data stream that serves to generate print images with at least two primary colors with the aid of a high-capacity printing system.

Multicolor print images to be output with the aid of a high-capacity printer (such as, for example, photographs, color graphics or multicolor text) are described with the aid of print and/or image data contained in a print data stream. The print data and/or image data specify color separations of typical primary colors that are used by high-capacity printers for image generation. Such high-capacity printers have the primary colors cyan, magenta, yellow, black corresponding to the CMYK color model as well as (possibly) one or more special colors such as, for example, the Océ Custom Tone colors from the applicant. Various high-capacity printers are described in the publication "The World of Printers, Technologies of Océ Printing Systems", Dr. Gerd Goldmann (Editor), Océ Printing Systems GmbH, Poing, 7th Edition, (2002). In particular, offset printing and digital printing technologies are described on pages 249-286. Various digital color printing systems are described on pages 287-325; the foundations of multicolor printing are described on pages 233-248; and the foundations of digital image processing are described on pages 209-232. Principles of highlight color printing are also described on pages 246-248.

Trapping generally means an overfilling of individual regions to be inked with the aid of a primary color, and thus an overfilling of the regions of individual color separations to be inked. Given imprecise positioning of two color separations to be transfer-printed next to one another, un-inked regions can arise at the boundary line of two adjoining regions to be inked, via which un-inked regions the color of the substrate material is visible in the finished print image. In order to avoid this, the region to be inked with the aid of individual primary colors is enlarged with the aid of a trapping method so that these regions are overfilled. Given an optimal positioning of multiple color separations atop one another (which cannot be implemented in practice), uniform overlaps would be generated by the trapping in the border regions of adjoining regions of different color separations to be inked. In practice, different overlap widths are achieved due to the positioning of the individual color separations, which is not 100% precise. Depending on the requirement (i.e. depending on the imprecision of a printer in the positioning of individual color separations atop one another), the degree of the enlargement of the regions of the individual color separations to be inked (i.e. the degree of the overfill) that is to be implemented is selected such that no regions in the print image are to be expected that are not inked or are only insufficiently inked in a region in which inked regions of different color separations adjoin one another.

A method and a printing system for trapping image data are known from the international patent application PCT/EP 2005/057147 (not previously published; internal file number of the applicant is 2004-1204P).

Methods and systems for trapping raster images along horizontal, vertical or diagonal directions that use only edges of diagonally adjacent pixels for trapping are known from the document U.S. Pat. No. 6,377,711 B1.

A method and a device for automated acceptance and relaying of document processing jobs are known from the document WO 03/065197 A2. In particular, a folder is thereby used in order to cache the print data of a print job in this folder. The print data stored in this folder are then processed further. For example, the document management system "Prisma Production" from Océ Printing Systems (which is likewise described in the aforementioned publication "World of Printers, Technologies of Océ Printing Systems") has such a functionality. High-capacity printing systems (whose printing speed is, for instance, 40 pages up to over 1000 pages of DIN A4 per minute) advantageously process print data streams such as, for example, a print data stream based on a Page Command Language (PCL), an Advanced Function Presentation (AFP) print data stream or a printer-side Intelligent Printer Data Stream (IPDS) corresponding to the AFP print data stream. The AFP data format of an AFP data stream has been developed by the International Business Machines Corp. (IBM). An additional print data stream standard distributed in high-capacity printers is the Line Condition Data Stream (LCDS) of Xerox Corp.

Details of the document data stream AFP™ are described in publication Nr. F-544-3884-01, published by International Business Machines Corp. (IBM) with the title "AFP Programming Guide and Line Data Reference". The document data stream AFP was developed further into the document data stream MO:DCA™, which is described in the IBM publication SC31-6802-06 (January 2004) with the title "Mixed Object Document Content Architecture Reference", for example. Details of this data stream are also described in U.S. Pat. No. 5,768,488.

AFP/MO:DCA data streams are frequently converted into data streams of the Intelligent Printer Data Stream™ (IPDS™) in the course of print production jobs. Details regarding IPDS data streams are described in the IBM document Nr. S544-3417-06, "Intelligent Printer Data Stream Reference", 7th Edition (November 2002), for example.

High-capacity printers implement a raster image process—advantageously with a separate raster image processor (RIP)—to generate raster images of individual color separations. This raster image processor can be realized as hardware or software. An image process integrated into an output management system is known from the document WO 02/093353 A1, with the aid of which output management system raster images can already be generated in the print preparation in the same way as with the aid of a raster image processor arranged in the printer, in order to check the individual color separations.

Methods and devices for electronic trapping of raster images are known from the documents US 2005/0219631 A1, U.S. Pat. No. 6,594,034 B1, U.S. Pat. No. 5,581,667 A and EP 0 833 216 A2. A trapping of print images described by Postscript or another page description language (PDL) is known from the document WO 95/20796 and U.S. Pat. No. 5,667,543 A. Additional methods for trapping are known from the documents DE 199 12 511 A1, U.S. Pat. No. 6,813,042 B2, EP 0 929 189 A2, JP 2004-262011A and U.S. Pat. No. 6,441,914 B1. The content (in particular the image processing methods and image generation methods known from these documents) are herewith incorporated by reference into the present specification.

The aforementioned publications or documents are herewith incorporated by reference into the present specification, and the methods, systems and measures described there can be applied in connection with the present preferred embodiment.

The methods known from the prior art to improve the image quality of an image to be output (in particular the trapping methods known from the prior art) are not suitable for use in connection with AFP, LCDS and PCL print data streams since these print data streams do not support the transfer of trapping information. It is also desirable to adapt a method for image processing that is to be implemented more flexibly to the requirements of a selected printer, and to be able to also modify this adaptation at a later point in time if necessary. A trapping is thus presently not possible in the known and further print data streams for high-capacity printing systems when print-prepared print data streams are already present. Un-inked regions can thus not be safely avoided due to imprecisions in the positioning of the individual color separations to be generated on a substrate material to be printed or an intermediate image carrier in known high-capacity printers. These un-inked regions are disruptively visible in the finished print image generated on the substrate material.

Printing systems are known in which a trapping for Postscript and PDF print data streams is implemented in the controller of the printed. However, such a trapping in real time is possible only with significant additional expenditure in high-capacity printing systems.

SUMMARY

It is an object to specify methods and devices for processing a print data stream in which an improvement of the quality of the print images to be produced with the aid of a high-capacity printing system is possible in a simple and flexible manner.

In a method/device for preparing a print data stream for generation of print images with at least two primary colors, the print data contained in an input print data stream are supplied to a processing stage as input print data. The input print data are processed with the processing stage wherein at least one raster image of a first primary color is generated. Trapping information is generated by use of the raster image. An output print data stream is generated that has the trapping information in addition to print data.

BRIEF DESCRIPTION OF THE DRAWINGS

FIG. 5A shows the schematic design of an AFP print data stream according to the preferred embodiment;

FIG. 5B shows the schematic design of a PCL print data stream according to the preferred embodiment;

DESCRIPTION OF THE PREFERRED EMBODIMENT

Figure 1:
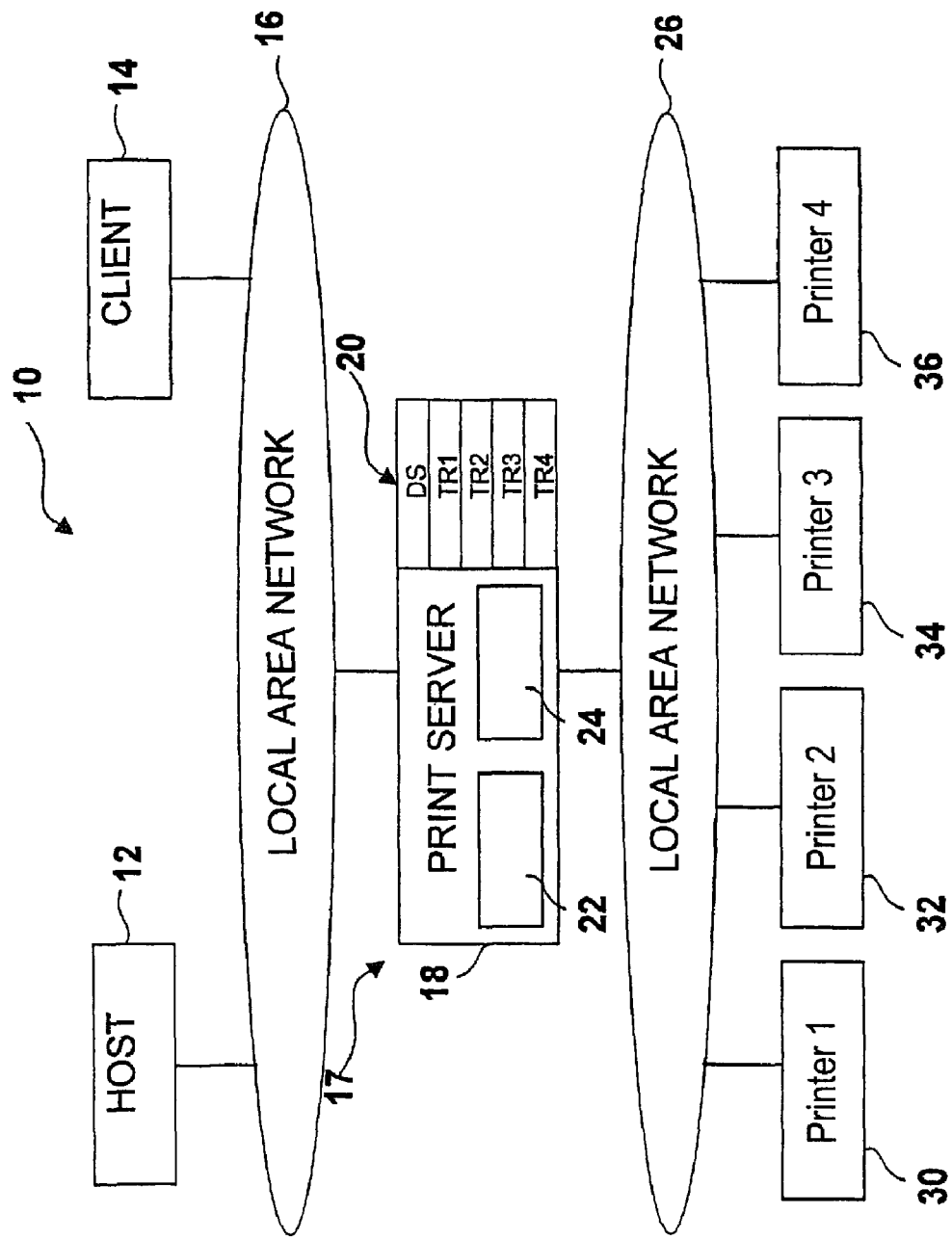
FIG. 1 is a block diagram for generation, processing, and outputting a print data stream.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

Via the methods and devices according to the preferred embodiment for processing a print data stream it is achieved that various methods for improving the print image can be implemented even in printers and data streams that do not inherently support this image improvement function. A trapping of raster images is in particular even possible in print data streams such as the AFP, LCDS and PCL print data streams, for example.

In some embodiments of the invention, the image information (in particular trapping information) that serves to improve the print image is added to the print data already contained in the print data stream so that the original print data are not lost. A flexible usage and additional processing of the print data as well as of the additional information is thereby possible in a simple manner. The original print data can thus be returned to at any time, whereby an alternative or additional processing of these original print data can occur even given a modification of the demands on the image information for print image improvement with the aid of the unmodified original print data. Modified output and print properties (in particular given a printer change and given a different substrate material) can thus be flexibly reacted to in that, for example, new additional image information or trapping information are generated that are adapted to the modified output and print properties.

In additional embodiments of the invention, multiple alternative items of image information or trapping information can also be generated and integrated into the output print data stream. The alternative image information is advantageously generated with different parameters or parameter sets. Depending on the output and print properties of a printer selected to output the print images corresponding to the print data, one of these items of alternative image information or a set of these items of image information are selected that are particularly suitable for this printer. Print jobs can thereby be simply and flexibly rerouted from one printer to another printer, wherein a printer driver advantageously, respectively selects suitable image information for the respective printer and uses it to output the print data. The processing cost (in particular the computing effort in the controller of the printer) to generate the image information or the trapping information can be significantly reduced or omitted.

This is in particular possible in that the image information are generated in a preliminary printing stage, in particular in an output management system and/or a print server. Such a preliminary printing stage is also designated as pre-press.

An improvement of the representation (in particular of multicolor print images) is thus possible in a simple and flexible manner with the aid of the methods and devices according to the preferred embodiment. The trapping is advantageously implemented dependent on the raster image (i.e. dependent on the pixel). For this, for each primary color of the printer a color separation is generated that establishes the regions to be inked with this primary color for trapping. These trapping raster images are then added to the print data stream, which contains the print data of the input data stream as well as at least the raster images with the trapping information and/or raster images with print images to improve the overall print image and is output as an output data stream.

The present preferred embodiment is particularly suitable to be realized as a computer program (i.e. as software) that is executed by a data processing system. The data processing system is advantageously a print server or another data processing system of a preliminary printing stage. The computer program prompts the data processing system to execute method steps of a method according to the preferred embodiment and to adapt a print data stream such that an improvement of a print image to be generated by this print data stream on a printer or copier system occurs. Such a computer program can be offered and distributed as a computer program product, in particular as a computer program product stored on an exchangeable data medium and/or as a computer program product transferrable via a network.

To better understand the present invention, in the following reference is made to the preferred exemplary embodiments presented in the drawings that are described using specific terminology. However, it is noted that the protective scope of the invention should not thereby be limited since such variations and additional modifications to the shown devices and the methods as well as such further applications of the invention are they are shown therein are viewed as typical present or future expertise of a competent man skilled in the art. The drawing figures discussed hereafter show exemplary embodiments of the invention.

A block diagram of a system 10 to generate, process and output a print data stream is shown in FIG. 1. The system 10 comprises a host computer 12 and a client computer 14 that are connected with a preliminary print stage 17 via a local network (LAN) 16. The preliminary print stage 17 comprises a print server 18 and a memory 20 connected with or integrated into the print server 18 to store print data. The print server 18 as well as the memory 20 can be integrated into an output management system. Such output management systems serve to control the print output in companies and printing centers. The output management systems are suitable to receive documents from various input systems 12, 14 and can augment documents with additional elements such as, for example, logos and signatures. The output management systems advantageously take over the production planning and production control for the available printing systems, as well as the distribution of the print jobs to the various printing systems.

For example, the output management systems implement a bundling of individual print jobs as well as a load distribution (load balancing) between the available printing systems. The output management systems also implement a color management for different printing systems. Output management systems also serve for printer monitoring and for reservoir monitoring of the reservoirs of the individual printing systems. Such an output management system is, for example, integrated into the server solution offered by Océ Printing Systems under the trade designation Prisma. Océ Prisma is a software for an intelligent output management system and is described in the publication "The World of Printers, Technologies of Océ Printing Systems", Dr. Gerd Goldmann (Editor), Océ Printing Systems GmbH, Poing, 7th Edition, (2002), Chapter 14. Individual components of such output management solutions are described in the documents WO 03/065197 A2 and WO 03/065197 A2. The content of these documents is herewith incorporated by reference into the present specification.

Output management systems are in particular employed given large print data sets. The output management system of the preliminary print stage 17 in particular serves to automatically accept, process and forward document processing jobs, in particular print jobs of the host computer 12 and the client computer 14. Additional host computers and client computers that are connected with the local network 16 can naturally transmit print jobs to the preliminary print stage 17. The preliminary print stage 17 is connected with the high-capacity printers 30, 32, 34 and 36 via a second local network 26. The print server 18 of the preliminary print stage 17 selects a suitable high-capacity printer from the available high-capacity printers 30 through 36 for the output of a print job and supplies a suitable print data stream to this suitable high-capacity printer.

The print speed of the high-capacity printers 30 through 36 is, for instance, between 40 pages up to over 1000 pages of DIN A4 per minute. The print data of the print jobs are thereby individually designed per page, wherein the print data can in particular be composed per page from static data and variable data. As already mentioned, the print server 18 receives the print jobs from the host computer 12 and the client computer 14 and prepares these for printing at a suitable high-capacity printer 30 through 36. In the event that it's necessary, the print server 18 converts the print data from a first data format into a second data format and transfers the converted data into a print queue associated with the selected printer or directly to the selected high-capacity printer 30 through 26 via the network 26. The processing of print jobs in a print production environment decisively depends on enabling an optimally high-performance, flexible processing of the print jobs in order to achieve a high utilization of the connected high-capacity printers 30 through 36, and therefore a high productivity. For processing of print data, print jobs can also comprise what are known as JOB tickets in which chaperone information regarding the respective print job (for example regarding the use of already-existing resource data, the number of copies to be generated, the input/output area, the wait queue etc.) is stored.

A typical print data format for high-capacity printers 30 through 36 is the AFP (Advanced Function Presentation) data format which, for example, is described in publication Nr. F-544-3884-01 from International Business Machines Corp. (IBM) with the title "AFP Programming Guide and Line Data Reference". Other suitable formats are, for example, a Page Command Language (PCL) as well as an "Intelligent Printer Data Stream" (IPDS).

The print server 18 comprises a raster image processing 22 and a trapping module 24. The raster image processing 22 of the print server 18 generates raster images from the supplied print data in the same manner as the raster image processors arranged in the high-capacity printers 30 through 36. The raster image processing 22 generates a separate raster image for each primary color specified in the input print data. Alternatively or additionally, the raster image processing 22 generates raster images from the supplied input print data dependent on the specification of the output primary colors via a print job associated with the print data and/or dependent on the available output colors of a selected high-capacity printer 30 through 36. The raster images generated with the aid of the raster image processing 22 are supplied to the trapping module 24 in order to produce a trapping (i.e. an overfilling) of the regions of the color separations to be inked. For trapping or for overfilling, the regions to be inked are enlarged so that the inked regions of one primary color reliably adjoin a boundary line at an adjacent region inked with another primary color, or so that the adjacent inked regions overlap in the border area so that no un-inked regions are present in the region of the boundary line. Such trapping methods are in particular known from the documents: US 2003/0179394 A1; US 2005/0219631 A1; U.S. Pat. No. 6,594,034 B1; U.S. Pat. No. 5,581,667 A; U.S. Pat. No. 6,377,711 B1; WO 95/20796; U.S. Pat. No. 5,667,543 A; EP 0 833 216 A2;

DE 199 12 511 A1; U.S. Pat. No. 6,813,042 B2; EP 0 929 189 A2; JP 2004-262011A; and from the unpublished International Patent Application PCT/EP 2005/02714. The content of these documents is herewith incorporated by reference into the present specification, in particular the trapping methods and arrangements for trapping described there.

The raster image processing 22 is a raster simulation module that is advantageously designed as software or as a hardware circuit. The raster image processing 22 simulates the unit of a print data stream converter of the print server or of the high-capacity printer 30 through 36 as well as an image raster device of the high-capacity printer 30 through 36 and rasters the input print data in a manner identical to that of the high-capacity printers 30 through 36. The rastered data comprise specifications of the regions to be inked by each color separation of an available primary color and are converted into a standard format of raster image files such as, for example, bitmap or TIFF. The raster images generated in this manner by the raster image processing 22 are supplied to the trapping module 24 to generate trapping data. These trapping data are respectively implemented for raster images of the color separations, and color-separation based raster images with trapping information are generated. In the CMYK color models typical in the high-capacity printer field, one item of trapping information is generated (advantageously as a raster image separation) for each color separation of the primary colors cyan, magenta, yellow and black. The print data (DS) supplied from the host computer 12 or client computer 14 to the preliminary print stage 17 as well as the first trapping information (TR1) pertaining to the color cyan, the second trapping information (TR2) pertaining to the color magenta, the third trapping information (TR3) pertaining to the color yellow and the fourth trapping information (TR4) pertaining to the color black are then stored in the memory 20. The original print data stored in memory 20 as well as the trapping data (TR1, TR2, TR3, TR4) are processed by the print server 18 into a modified print data stream that is converted if necessary into another suitable data format. The original print data transferred from the host computer 12 or client computer 14 as well as, additionally, the trapping information (TR1, TR2, TR3, TR4) are thus contained in this modified print data stream. The print server 18 selects a suitable high-capacity printer 30 through 36 and supplies the modified print data stream for generation of the documents specified with the aid of these print data to the selected high-capacity printer 30 through 36.

The raster image processing 22 is advantageously executed as software. Such a raster image processing is also designated as a true proof and in particular serves to simulate the actual print output. A print data stream image present in a print data language such as AFP, PCL or LCDS, LPDS can thus be reproduced per pixel with the aid of the raster image processing 22 and in particular can be visually inspected. As already mentioned, the raster process of the raster image processing 22 corresponds to the print raster process of a high-capacity printer 30 through 36.

In alternative embodiments, the system 10 comprises a global network (WAN) in addition or as an alternative to the local networks 16, 26. Such a global network is, for example, the World Wide Web of the Internet. Instead of the two local networks 16, 26, only one network (in particular a local network or a global network) can also be provided with which both the host computer 12, the client computer 14 as well as additional host and client computers, the high-capacity printers 30 through 36 and the preliminary print stage 17 are then connected.

Figure 2:
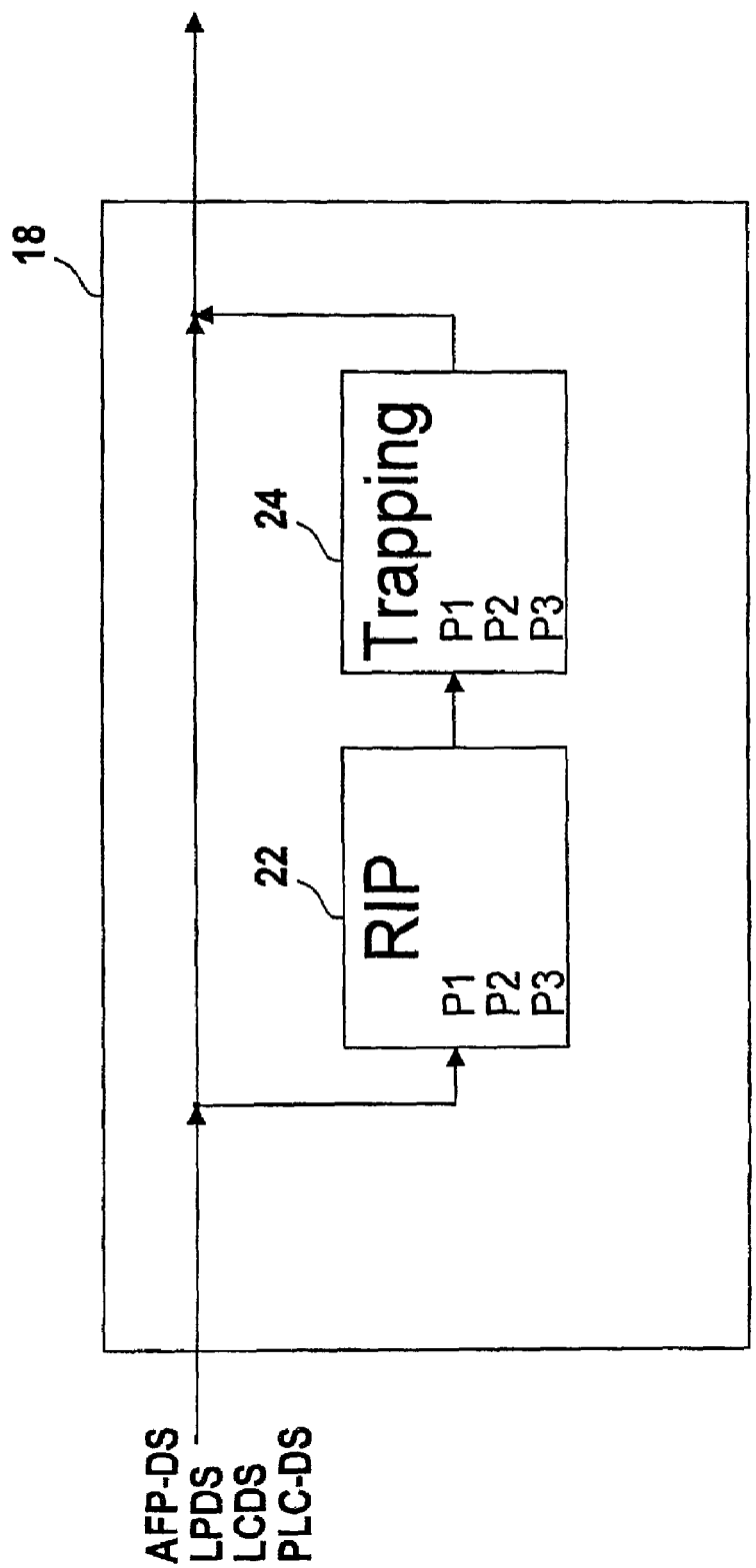
FIG. 2 shows a block diagram for processing the print data stream in a print server serving as a preliminary print stage.

A block diagram for processing an AFP, LCDS, LPDS or PCL print data stream in a print server 18 serving as a preliminary print stage 17 is shown in FIG. 2. The print data supplied to the print server 18 are supplied to the raster image processing 22 and advantageously are cached by the print server 18. In the present exemplary embodiment, the raster image processing 22 outputs a parameter set suitable for a high-capacity printer 30 through 36 to generate raster images from the supplied print data and generates raster images depending on the selected parameter set. A color reduction or color adaptation to the output colors present in the print job, to the available high-capacity printers 30 through 36 or to preset output colors can thereby be implemented. The colors can thereby in particular also comprise special colors such as, for example, what are known as the tone colors of Océ Printing Systems. The raster image processing 22 supplies raster images to the trapping module 24.

Depending on the parameters specified in the JOB ticket of the print job or by the print job itself, and/or dependent on the requirements for the trapping that result from the output properties of the high-capacity printer 30 through 36, the trapping module 24 feeds through a trapping of the raster images. For this the trapping module 24 uses a suitable printing system. For each primary color, a trapped (i.e. overfilled) raster image is advantageously generated that advantageously comprises only the additional regions to be inked with this primary color that, due to the trapping, are to be inked in addition to the raster images generated by the raster image processing 22. The trapping information thus comprises raster image data that output only the additional regions to be inked with the aid of the primary colors based on the trapping. The trapping can alternatively also be implemented for a portion of the primary colors, for example for only one of two primary colors, whereby only the regions to be inked of a primary color in the border regions are overfilled (i.e. enlarged) at adjacent regions to be inked of the additional primary color.

The cached input print data are advantageously transferred together with the trapping information from the print server 18 to the high-capacity printer 30 through 36 in the form of a modified print data stream. By retaining the original print data or print information in the print data stream, additional print image improvement methods can be implemented with the aid of this original, unadulterated print data by the high-capacity printer 30 through 36 itself or in an additional processing in the preliminary print stage 17. A flexible adaptation of the trapping information to a concretely selected printer 30 through 36 is also possible at a later point in time since the original print data (i.e. the input print data) are still contained in the modified print data stream. In particular, additional trapping data suitable for a selected high-capacity printer 30 through 36 can be generated.

Alternatively, multiple items of trapping information can be generated for different printers 30 through 36 and added to the modified print data stream in order to then, dependent on a concretely selected high-capacity printer 30 through 36, select trapping information suitable for this printer 30 through 36 from the trapping information available in the modified print data stream. Via the additional storage of trapping information it is also possible simply to let the trapping be implemented by the printer itself in printers with integrated trapping modules, since the original print data are furthermore available in the modified DDS. The trapping can be implemented in the print server 18 (and thus already in a preliminary print stage 17) and thus requires no resources of the high-capacity printer 30 through 36, whereby the printing process is not delayed and a high utilization of the high-capacity printers 30 through 36 is possible.

Figure 3:
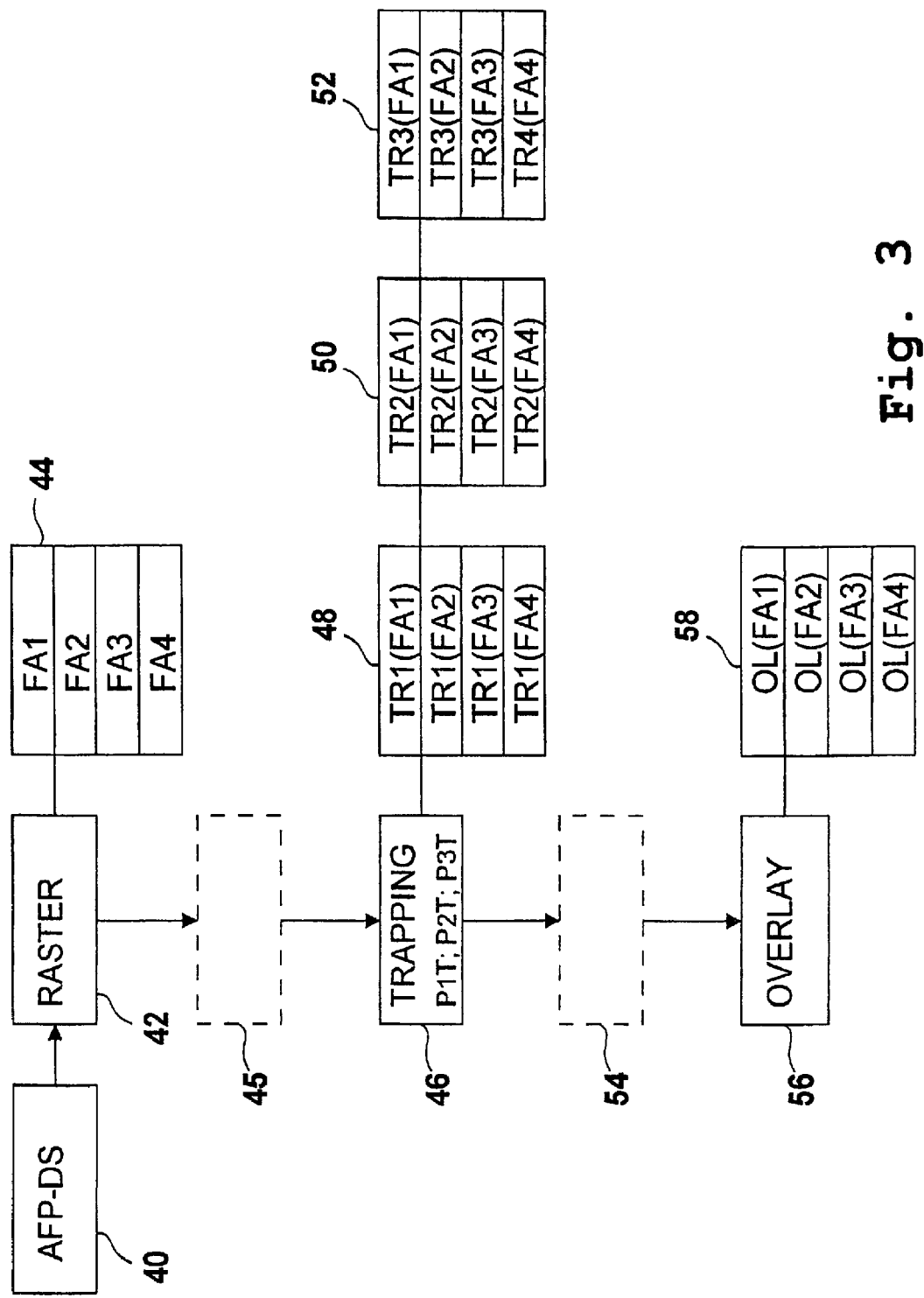
FIG. 3 is an overview of the data generated in the processing of the print data stream according to a first embodiment of the invention.

An overview of the data generated in the processing of an AFP print data stream 40 according to a first exemplary embodiment of the invention is presented in FIG. 3. The AFP print data stream 40 is supplied to a first process 42 to generate raster images. The print data of the AFP print data stream 40 describe a print image that comprises four primary colors, advantageously the primary colors cyan, magenta, yellow and black. For each of these primary colors, via the raster process 42 a raster image is generated that is stored as a first color separation (FA1), a second color separation (FA2), a third color separation (FA3) and a fourth color separation (FA4) in a memory region of the memory 20 as raster data 44 of the raster process 42.

Additional image improvement processes can be implemented in an additional, optional process 45, such as an edge smoothing, a raster adaptation, a color application limitation and further improvement procedures. The raster data 44 of the color separations (FA1, FA2, FA3, FA4) are subsequently processed further in a trapping process 46. In the present exemplary embodiment, three parameter sets P1T, P2T, P3T are assigned to the trapping process wherein a trapping raster image is generated with the aid of a respective parameter set. First trapping raster data TR1(FA1), TR1(FA2), TR1(FA3), TR1(FA4) are generated with the aid of the first parameter set P1T; second trapping raster data 50 TR2(FA1), TR2(FA2), TR2(FA3), TR2(FA4) are generated with the aid of the second parameter set P2T; and third trapping raster data 52 TR3(FA1), TR3(FA2), TR3(FA3), TR3(FA4) are generated with the aid of the first parameter set P3T.

The trapping raster image data 48, 50, 52 and/or the raster image data 44 are processed in a subsequent, optional image processing process 54 in the same manner as described in connection with the processing process 54, in which at least one method to improve the print output is implemented. A superimposition of the raster image data 44 with the trapping raster image data 48, 50 and/or 52 is subsequently implemented, wherein superimposed raster image data 58 (OL (FA1), OL(FA2), OL(FA3), OL(FA4)) are generated that are used for print output. This superimposition can, for example, occur via addition of the trapping raster data 48, 50, 52 to the AFP print data stream 40, in that these trapping raster data 48, 50, 52 are added to the AFP print data stream as raster image data to overlap the additional print image.

Suitable trapping raster image data 48, 50, 52 can then be selected with the aid of a printer driver, in particular via the specification of a trapping printing system P1T, P2T, P3T suitable for this printer from the available trapping raster image data 48, 50, 52, wherein only these print data contained together with the original print data in the AFP print data stream 40 are transferred to the high-capacity printer 30 through 36.

Figure 4:
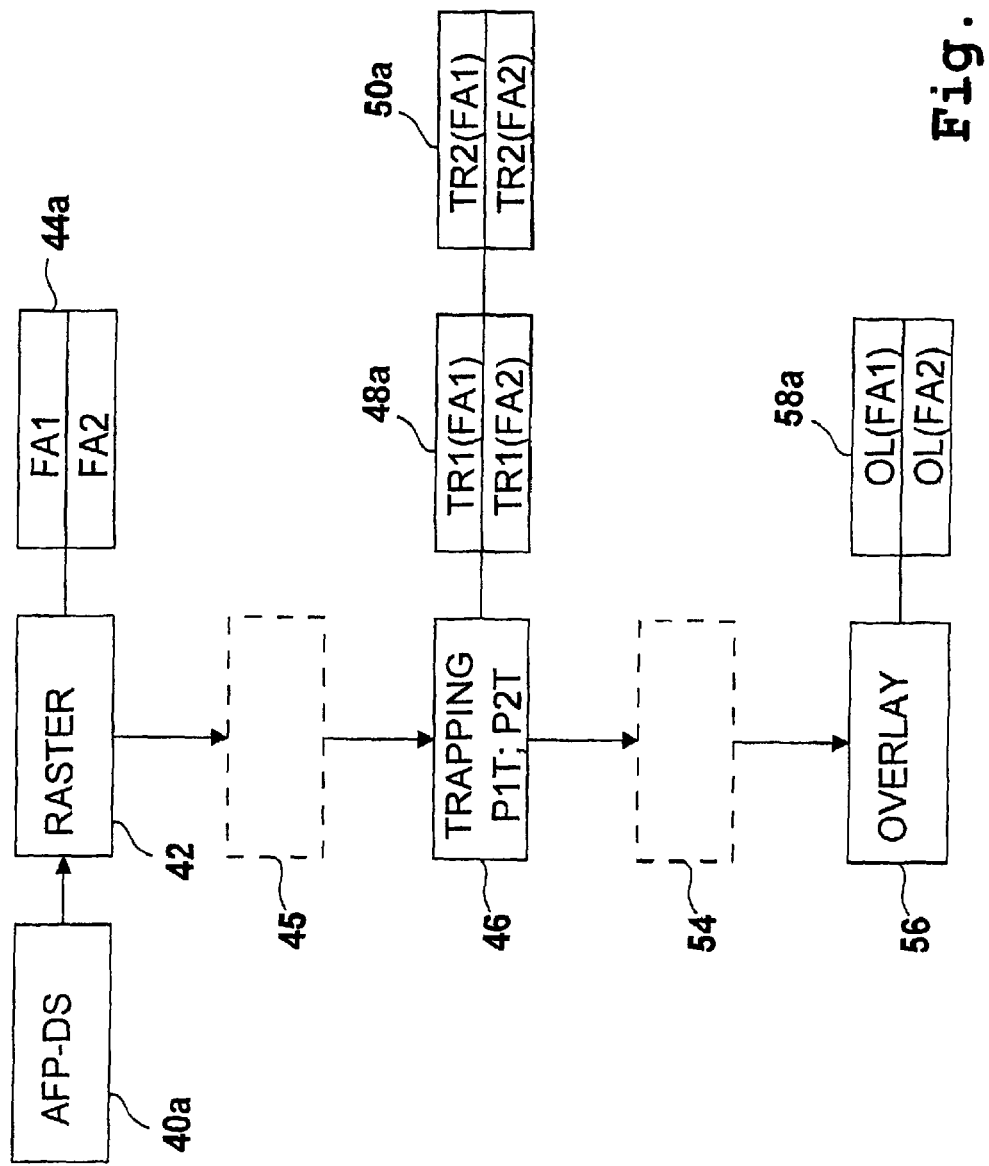
FIG. 4 is an overview of the data generated in the processing of the print data stream according to a second embodiment of the invention.

An overview of the data generated in the processing of an AFP print data stream 40*a* according to a second exemplary embodiment of the invention is presented in FIG. 4, in which only two primary colors are used to output the print images. These primary colors are in particular the color black and a special color. However, two primary colors of the CMYK color model can also be used in the same manner. The workflow of the individual processing processes 42, 45, 46, 54, 56 occurs in the same manner as described in connection with FIG. 3. The raster image data 44A, the trapping raster image data 48A, 50A and the superimposed raster image data 58A for the two color separations of the exemplary embodiment according to FIG. 4 conform with the color separations designated with the same reference characters in FIG. 3.

The structure of an AFP print data stream according to the invention is presented in FIG. 5*a*. The schematically represented AFP print data stream exemplarily is comprised of the print data according to the preferred embodiment to generate a print page. The print data stream begins with the instruction "Begin Document" (BD), followed by the instruction "Begin Page" (BP). A data block with the print data to generate the print page subsequently follows that essentially corresponds to the print data transferred from the host computer 12 or the client computer 14 to the print server 18. If necessary, the print data contained in this data block (DATA) have been converted (for example by the printer server 18) into a different suitable data format. The instruction "Include Overlay2" (IO) follows this data block (DATA). This instruction has the effect that, of the three subsequent overlay blocks (OVERLAY1, OVERLAY2, OVERLAY3) to overlay the raster images (generated with the aid of the print data (DATA)) with the raster images specified by OVERLAY2. OVERLAY2 advantageously contains trapping raster image data that have been generated with the aid of the second parameter set P2. For example, OVERLAY1 extends the regions to be inked that are determined by the print data (DATA) into regions to be overfilled by one pixel or, respectively, respectively by one pixel. An overlap with an adjoining region to be inked with an additional print color (i.e. a trapping) by one pixel is thereby achieved. OVERLAY2 expands the regions to be inked by two pixels into regions to be overfilled, and OVERLAY3 expands them by three pixels. Depending on the positioning precision (i.e. depending on the register precision) of a high-capacity printer 30 through 36, an overlay (OVERLAY1, OVERLAY2, OVERLAY3) suitable for this printer can be selected and superimposed with the print images generated by the print data (DATA). The overlay data (OVERLAY1, OVERLAY2, OVERLAY3) respectively each comprise one color separation, the primary colors described by the print data DATA or the primary colors provided by a printer. The instructions "End Page" (EP) and "End Document" (ED) follow the overlay data (OVERLAY3).

The structure of a PCL print data stream according to the preferred embodiment is schematically depicted in FIG. 5*b*, wherein, in PCL data streams for overlaying, the print images of the individual color separations (that are likewise contained in the print data (DATA) in the PCL data stream) are used in macros (MACRO1, MACRO2, MACRO3) containing print data. The regions to be inked that are described by the print data contained in the macros (MACRO1, MACRO2, MACRO3) generate an overfilling (i.e. a trapping) of the regions to be inked that are specified by the print data (DATA) in a manner identical to the overlay data (OVERLAY1, OVERLAY2, OVERLAY3) of the ADP print data stream according to FIG. 5*a*.

In both the AFP print data stream according to FIG. 5*a* and in the PCL data stream according to FIG. 5*b*, a printer driver of a selected high-capacity printer 30 through 36 selects—based on the instructions and/or information (contained in a JOB ticket) about the printer specified by the printer driver in the printer driver itself—suitable overlay data (OVERLAY1, OVERLAY2, OVERLAY3, MACRO1, MACRO2, MACRO3) from the available overlay data and deletes the additional overlay data from the print data stream to be transferred to the printers 30 through 36, or does not add these to the print data stream to be transferred to the printers 30 through 36. The printer driver thus determines the required overlay data (OVERLAY1, OVERLAY2, OVERLAY3, MACRO1, MACRO2, MACRO3) and generates a modified print data stream to be transferred to the printer. The modified print data stream has an exemplary design similar to the AFP and PCL print data streams shown in FIGS. 5a and 5b. The trapping information in these data streams is thus contained as pixel data that are added as trapping print data to the respective print data stream. The trapping raster image data added to the respective data stream advantageously indicate only the regions to be additionally inked for trapping and not the entire regions to be inked, whereby the data set to transfer the trapping information is relatively small.

Figure 6:
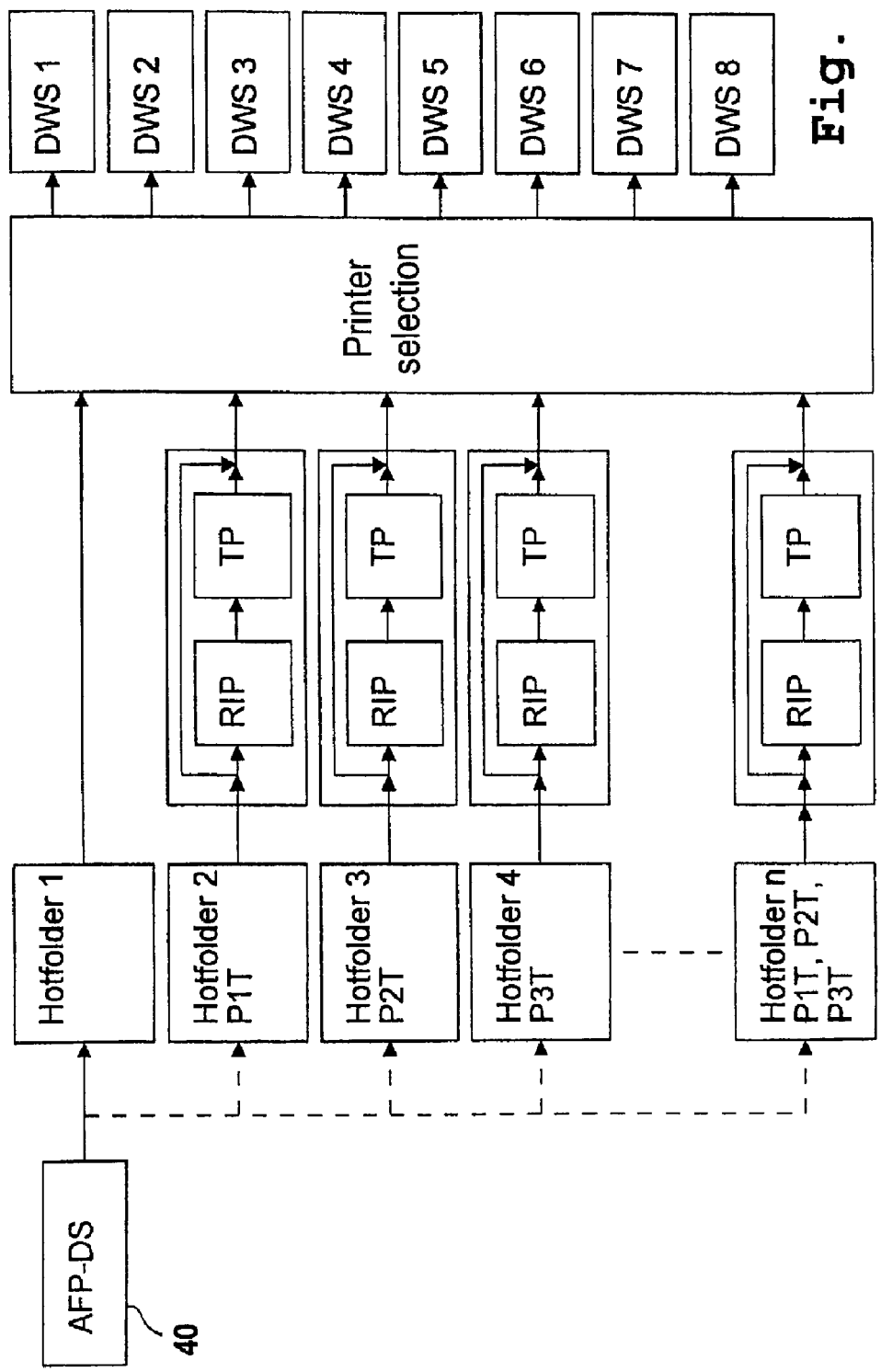
FIG. 6 is a block diagram for selection of the processing parameters and for processing of an AFP print data stream in a preliminary print stage according to a third embodiment of the invention.

A block diagram to process an AFP print data stream in a preliminary print stage as well as to select the processing parameters of this AFP print data stream 40 according to a third embodiment of the invention is shown in FIG. 6. Based on a corresponding instruction, the host computer 12 or the client computer 14 supplies the AFP print data stream 40 to a first input folder (Hotfolder 1), a second input folder (Hotfolder 2), a third input folder (Hotfolder 3), a fourth input folder (Hotfolder 4) or an additional input folder (Hotfolder n). Additional input folders can be provided as necessary.

No trapping parameter is associated with the first input folder (Hotfolder 1), such that the print data supplied to this first input folder are not processed by the trapping module (TP) of the print server 18 and are directly supplied to a printer selection module. The printer selection module associates the print data of a print job or the modified print data of the print job with a print queue (DWS1 through DWS8) that is associated with a high-capacity printer suitable to output the print images corresponding to the print data. The print data of an AFP print data stream 40 that is supplied to the second input folder (Hotfolder 2) are processed into raster images with the aid of the raster image process (RIP) and are subsequently supplied to the trapping module (TP).

The trapping module (TP) generates trapping information (advantageously in the form of raster image data) dependent on the parameter set P1T associated with the second input folder (Hotfolder 2). The trapping information generated with the aid of the trapping module (TP) is output by the trapping module (TP) and is added to the print data of the original AFP print data stream 40 that are cached and advantageously not altered during the processing of the print data by the raster image process (RIP) and the trapping module (TP). The print server 18 thus outputs a modified print data stream that comprises the print data contained in the supplied AFP input print data stream 40 as well as the generated trapping information. This print data stream is supplied by the printer selection to a print queue (DWS1 through DWS8) that is associated with a printer that is suitable to output print images corresponding to the print data.

The AFP print data stream 40 is processed in the same manner as in connection with the second input data folder (Hotfolder 2) when said AFP print data stream 40 is supplied to the third input folder (Hotfolder 3) or the fourth input folder (Hotfolder 4), wherein the trapping module (TP) uses a second parameter set P2T for trapping given storage of the print data stream in the third input folder (Hotfolder 3). A third parameter set P3T for trapping with the aid of the trapping module (TP) is used upon the AFP print data stream 40 being supplied to the fourth input folder (Hotfolder 4). Upon supplying AFP print data stream 40 to the additional input folder (Hotfolder n), trapping information is generated by the trapping module (TP) with the aid of the first parameter set (P1T), the second parameter set (P2T) and the third parameter set (P3T) and is added to the data stream to be supplied to a print queue (DWS1 through DWS8).

As an alternative to the selection of the input folder by the host computer 12 or the client computer 14 or by an application program executed by these computers 12, 14, a suitable input folder can be selected by an output management system of the preliminary print stage 17. As an alternative to the integration of the raster image process (RIP) and the trapping module into the print server 18 or into an output management system of the preliminary print stage 17 that are shown in FIG. 6, the raster image process (RIP) and/or the trapping module (TP) can be arranged outside of the preliminary print stage 17 or the print server 18 and can be connected with the preliminary print stage 17 or the print server 18 via a suitable interface for data exchange.

Figure 7:
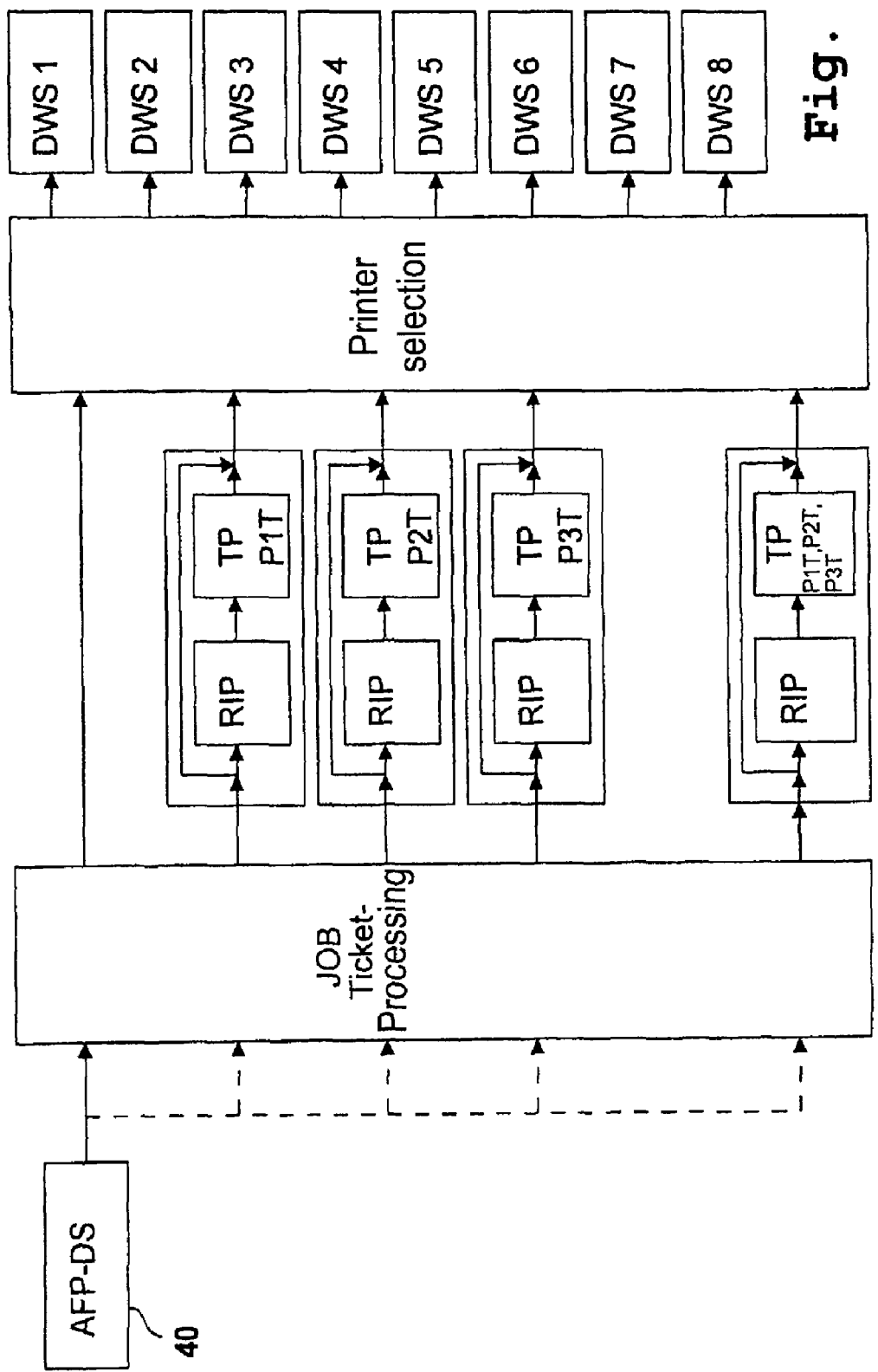
FIG. 7 is a block diagram for selection of the processing parameters and for processing of an AFP print data stream in a preliminary print stage according to a fourth embodiment of the invention.

A block diagram for processing the AFP print data stream 40 as well as for selection of the trapping parameters in the preliminary print stage 17 according to a fourth embodiment of the invention is shown in FIG. 7. In contrast to the third embodiment of the invention shown in FIG. 6, the association of the AFP print data stream 40 with a trapping module in the fourth embodiment occurs with a suitable trapping parameter set (P1T, P2T, P3T) with the aid of a JOB ticket processing. In the fourth embodiment of the invention, a JOB ticket that contains specifications about the processing of the print data contained in the AFP print data stream 40 is associated with the AFP print data stream 40. The JOB ticket in particular also contains information about parameters that are to be used in the raster image process (RIP) in order to process the print data contained in the AFP print data stream 40 into raster images in a suitable manner. These parameters for raster image generation are used both by the raster image process in the preliminary print stage and in a subsequent processing of the print data a high-capacity printer that is subsequently selected to generate the print images specified by the print data. The JOB processing decides whether the trapping module generates trapping information with the aid of the first parameter set (P1T), trapping information with the aid of the second parameter set (P2T) and/or trapping information with the aid of the third parameter set (P3T). The generated trapping information is added to an output print data stream that is supplied to a print queue DWS1 through DWS 8 in the same manner as in the third embodiment of the invention described in connection with FIG. 6.

Figure 8:
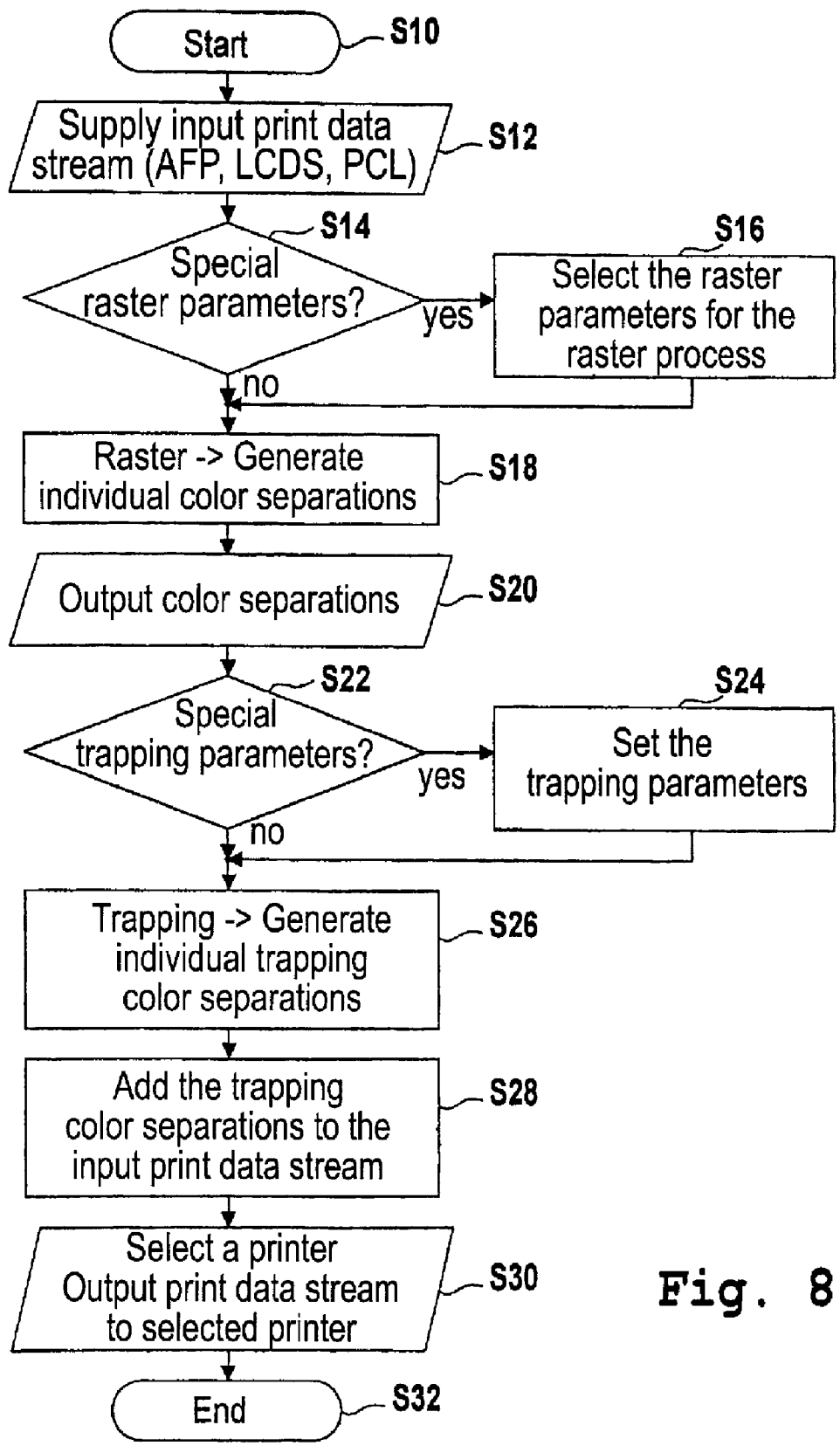
FIG. 8 shows a workflow plan for generation of a print data stream with trapping information according to a fifth embodiment of the invention.

A workflow plan according to a fifth embodiment of the invention is presented in FIG. 8. The workflow is started in Step S10. An input print data stream is subsequently supplied in Step S12. This print data stream is in particular an AFP, LCDS or PCL print data stream. In Step S14 it is subsequently checked whether the input print data stream contains special information about raster parameters to be used. If that is the case, these special raster parameters are determined in Step S16 and are preset for the subsequent raster process to be implemented in Step S18. In Step S18, the input print data of the supplied input print data stream are processed into raster images and individual color separations are generated. In Step S20, these raster images are output to a trapping module. In Step S22 it is checked whether special trapping parameters for trapping the supplied raster images are provided, for example via a specification regarding the trapping parameters to be used in the input print data stream. If that is the case, in Step S24 these special trapping parameters are determined and set. Otherwise, a preset trapping parameter for subsequent trapping in Step S26 remains set. In Step S26 the supplied raster image data are processed dependent on the set trapping parameters and trapping information is generated. Individual trapping color separations are additionally generated. These trapping color separations are also designated as a trapping raster image. In a subsequent Step S28, the trapping color separations are added to the print data contained in the input print data stream so that a modified print data stream is generated. This print data stream is output to a selected printer in Step S30. The workflow is ended in Step S32.

Figure 9:
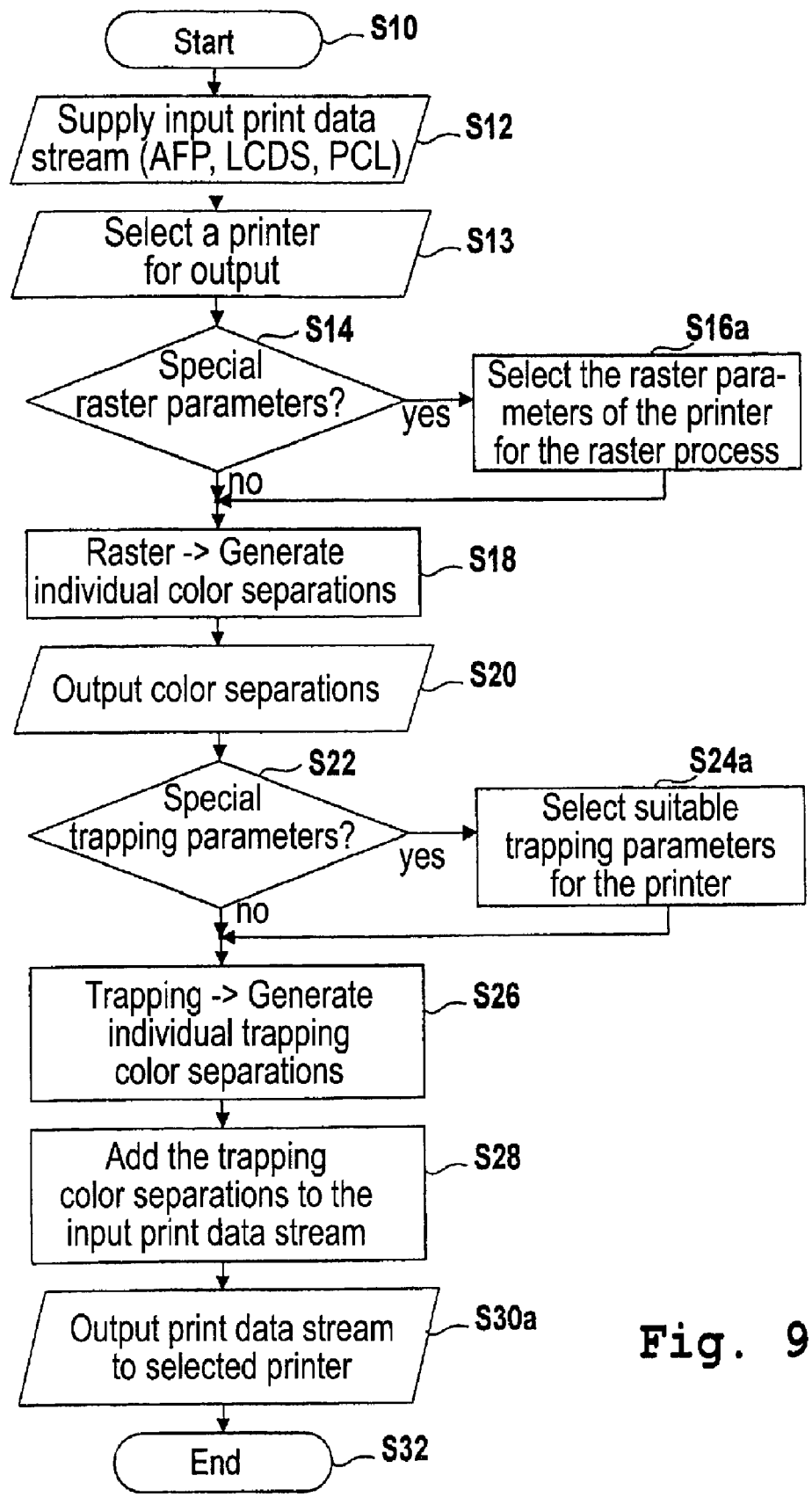
FIG. 9 is a workflow plan for printer-dependent trapping of a print data stream with trapping information according to a sixth embodiment of the invention.

A workflow for processing input print data of an input print data stream according to a sixth embodiment of the invention is shown in FIG. 9. The workflow of the sixth embodiment according to FIG. 9 differs from the workflow of the fifth embodiment according to FIG. 8 only in that a printer for output of print images corresponding to the input print data is selected in the additional Step S13. The printer selection thus occurs before the processing of the input print data into trapping information. In contrast to Step S16 according to FIG. 8, in Step S16a a special raster parameter more suitable for the selected printer is selected and set for the subsequent raster process. In contrast to Step S24 of the fifth embodiment of the invention according to FIG. 8, in Step S24a a trapping parameter more suitable for the printer selected in Step S13 is selected and preset or set. In contrast to Step S30 according to FIG. 8, no selection of the printer occurs in step S30a; rather, the modified print data stream is output to the printer already selected in Step S13. The output of this print data stream to the selected printer can thereby occur such that the modified print data stream is associated with a print queue associated with this printer or is stored in this print queue or, alternatively, is supplied directly to the selected printer.

Figure 10:
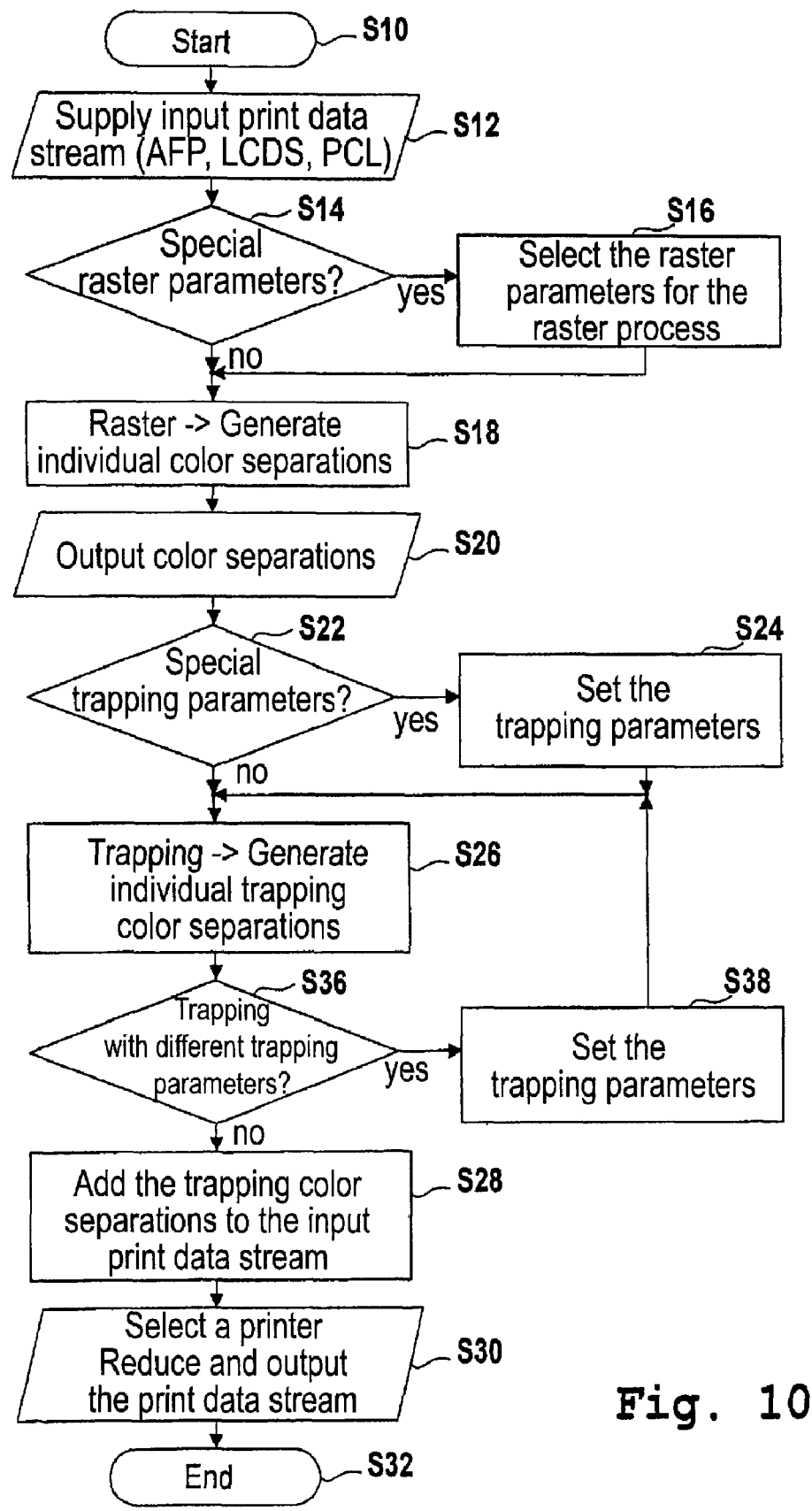
FIG. 10 is a workflow plan to generate a print data stream with multiple alternative items of trapping information.

A workflow to process the input print data of an input print data stream according to a seventh embodiment of the invention similar to the workflow plan of the fifth embodiment of the invention according to FIG. 8 is shown in FIG. 10. In contrast to the fifth embodiment of the invention, in Step S36 it is hereby checked whether an additional trapping procedure should be implemented with another trapping parameter. If that is the case, in Step S28 this additional trapping parameter or this additional trapping parameter set is set so that this trapping parameter set is used to generate the trapping color separations or the trapping raster image in the subsequent trapping in Step S26. This procedure is repeated until the trapping module has generated trapping information regarding all preset parameters, such that in Step S36 it is established that no additional trapping procedure should be implemented. The trapping information generated with regard to the individual parameter sets (P1T, P2T, P3T) is added to the input data stream as trapping color separations or as trapping raster images, such that a modified print data stream is generated similar to the print data streams shown in FIGS. 5a and 5b. A printer suitable to output the print images specified by the input print data stream is then selected in Step S30b. Depending on the output properties of the selected printer, a modified print data stream is output to this printer or to a print queue associated with this printer, which modified print data stream contains a trapping raster image or trapping color separations suitable for this printer and advantageously does not contain the additionally generated trapping images or trapping color separations that are not as suitable for the trapping in this printer as the selected trapping raster image or the selected trapping raster images that are to be added to the print data stream.

A trapping is in particular required in high-capacity printers (commercial printers) to which print data streams are supplied from customers or application programs. In these print data streams it is often also not possible, for security reasons, to influence the individual object and the composition of the print data streams in order in particular to preclude manipulations of the printed information.

With the aid of the preferred embodiment it is possible to avoid white areas between two color regions (what are known as flashes) and color borders in spite of an imprecision of the printer in the positioning of the print images of individual color separations atop one another. Methods for trapping in the controller of a printer are in particular known in Postscript print data streams and pdf print data streams. Such printer-side trapping methods are not known in other print data streams distributed in the high-capacity printer field such as the aforementioned AFP print data stream, the LCD print data stream, the LPDS print data stream and the PCL print data stream.

According to the preferred embodiment, these print data streams are rastered with the aid of a raster module (what is known as the true proof) and converted into a bitmap-based data format. These rastered images are then processed further with the aid of a suitable trapping method. The trapping according to the preferred embodiment is thus upstream of the controller of the printer in that a separate raster process is provided that simulates raster process of the printer, and the rastered image data are then processed further in the trapping method. The a print data stream-independent and controller-independent trapping solution is thus provided by the preferred embodiment.

To optimize the print quality of a print production path, the print data of a print data stream are frequently generated specific to the printer or printer model by a user program. This also contains no trapping methods that are implemented by a user program with printer-specific parameters upon generation of the print data stream. Printer-specific grey value curves or suitable dithering matrices can also be taken into account in the generation of the print data stream.

If such print data generated for a specific printer or a specific printer model are used for printing on other printers with different settings or other properties, this normally leads to a poorer quality. It is in particular thereby difficult to interrupt a print job begun on one printer and continue it on another printer of a different type. In order to be able to furthermore ensure the print quality given printout of these print data, in many cases a new print data stream that is optimized for the new printer must then be generated by the application program. Alternatively, the quality losses must be accepted given continuation of the print job on the different printer.

Via the trapping according to the preferred embodiment, the print data do not need to be regenerated by the application program given a printer change, such that a time savings can be achieved. A quality improvement is thus also possible given printing with print data that have not been optimized for the respective printer. The preferred embodiment furthermore enables the print data generated by the application program to be held ready and be made available unchanged. Further additional print data and/or parameters that contribute to the implementation of quality-improving measures as well as to quality improvement of the print image to be output are added to the print data stream in order to improve the print image output by the printer. The additional print data can in particular be raster image color separations (what are known as bitmap planners) that specify the regions to be inked for trapping for the respective color separation.

Parameters to improve the print quality of a print image to be output can in particular be parameters for implementation of a trapping method, parameters for implementation of an edge smoothing method with which the quality of the printout can be respectively improved specific to the printer or printer model upon printing. A flexible design of the workflow is thereby possible since a print server or an output management system can establish when and in which production step print data adapted to a printer are generated, processed or used for production control. An adaptation to another printer or a different printer model can also be implemented in a simple manner. The specifications contained in the print data stream or JOB ticket for post-processing of the generated print image or print product can also be taken into account in the optimization of the print data in the optimization of the print data stream. Although preferred exemplary embodiments have been shown and described in detail in the drawings and in the preceding specification, they should be viewed merely as purely exemplary and not as limiting the invention. It is noted that only the preferred exemplary embodiments are shown and described, and all variations and modifications that presently and in the future lie within the protective scope of the invention should be protected. The preferred embodiment is in particular suited to being realized as a computer program (software). As a computer program module it can therefore be distributed as a file on a data medium such as a diskette, CD-ROM or DVD, or as a file via a data or, respectively, communication network. Such and comparable computer program products or computer program elements are embodiments of the invention. The design according to the preferred embodiment can be implemented in a computer, in a printing apparatus or in a printing system with upstream or downstream data processing apparatuses. Suitable control and/or data processing units that in particular are executed as a computer and with whose help the preferred embodiment is applied can thereby contain additional known technical devices such as input means (keyboard, mouse, touchscreen), at least one microprocessor, at least one data and/or control bus, at least one display device (monitor, display) as well as at least one working memory, a fixed disk storage and a network card.

We claim:

1. A method for preparing a print data stream for generation of print images with at least two primary colors with a high-capacity printing system, comprising the steps of:
   supplying the print data contained in an input print data stream to a processing stage as input print data;
   processing the input print data with the processing stage wherein at least one raster image of a first primary color is generated;
   generating at least one item of trapping information with the raster image; and
   generating an output print data that has trapping information in addition to the input print data or in addition to data of the raster image of the first primary color.

2. A method according to claim 1 wherein the output print data stream is stored for additional processing or is supplied to an additional processing stage.

3. A method according to claim 2 wherein the output print data stream is supplied to the high-capacity printing system.

4. A method according to claim 1 wherein the trapping information is generated dependent on at least one preset trapping parameter, or the image information is generated depending on at least one preset image information parameter.

5. A method according to claim 1 wherein the input print data comprise information regarding generation of an at least two-color print image, wherein one raster image is generated for each of the primary colors specified by the input data or one raster image is produced for each of the primary colors available in the high-capacity printing system.

6. A method according to claim 1 wherein a modified output print data stream containing the trapping information or image information is generated with the input print data and the trapping information or image information, the modified output print data stream being stored in a print server, the output print data stream being associated by the print server with one of a plurality of high-capacity printing systems.

7. A method according to claim 6 wherein the input print data contained in the input print data stream or the at least one raster image as well as the trapping information or image information are contained in the modified output print data stream.

8. A method according to claim 1 wherein the trapping information comprises a trapping raster image that specifies the regions to be inked with a primary color for trapping, or wherein the image information comprises an image information raster image that specifies the regions to be inked with a primary color for image improvement.

9. A method according to claim 8 wherein the raster image of the primary color and the trapping raster image of a same primary color are superimposed, wherein a common raster image is generated as a color separation of this primary color, or wherein the raster image of the primary color and the image information raster image of a same primary color are superimposed, wherein a common raster image is generated as a color separation of said primary color.

10. A method according to claim 1 wherein the raster image generated from the input data with the processing stage coincides with a raster image generated from the input data with a raster image processor of the high-capacity printing system.

11. A method according to claim 1 wherein the input print data stream is a LC print data stream, an LD print data stream, a PCL print data stream, or an AFP print data stream.

12. A method according to claim 1 wherein at least two input folders are provided to supply the input print data stream, and wherein to said input folders the print data of the print data stream is selectively provided depending on processing of the print data stream that is to be implemented, wherein no trapping information is generated upon supplying the print data of the input print data stream to the first input folder and the trapping information is generated upon supplying the print data of the input print data stream to the second input folder; or wherein at least two input folders are provided to supply a print data stream, and wherein to said input folders the print data of the print data stream is selectively provided depending on a provided processing of the print data stream, wherein no image information is generated upon supplying the print data of the input print data stream to the first input folder and the image information is generated upon supplying the print data of the input print data stream to the second input folder.

13. A method according to claim 12 wherein at least one third input folder is provided, wherein trapping information is generated with a second trapping parameter differing from a first trapping parameter associated with the second input folder upon supplying the print data of the input data stream into the third folder; or wherein at least one third input folder is provided, wherein image information is generated with a second image information parameter differing from a first image information parameter associated with the second input folder upon supplying the print data of the input data stream into the third folder.

14. A method according to claim 1 wherein the processing stage is contained in an output management system, is connected with an output management system via an interface, or is contained in a print server.

15. A method according to claim 1 wherein the input print data and the trapping information or the input print data and the image information are supplied to the high-capacity printing system, wherein the high-capacity printing system generates a raster image with a raster image processor, said raster image coinciding with the raster image generated from the same input print data with the processing stage.

16. A device for preparing a print data stream for generation of print images with at least two primary colors with a high-capacity printing system, comprising:
   a processing stage that processes input print data supplied to it with an input print data stream and generates at least one raster image of a first primary color;
   said processing stage generating at least one item of trapping information with a raster image of the first primary color; and
   said processing stage generating an output print data stream that has the trapping information in addition to the input print data or in addition to data of the raster image of the first primary color.

17. A device according to claim 16 wherein the processing stage stores an output print data stream for additional processing or supplies the output print data stream to an additional processing stage.

18. A computer-readable non-transient medium comprising a computer program for preparing a print data stream for generation of print images with at least two primary colors with a high-capacity printing system, said program comprising the steps of:
   supplying the print data contained in an input print data stream to a processing stage as input print data;
   processing the input print data with the processing stage wherein at least one raster image of a first primary color is generated;
   generating at least one item of trapping information with the raster image; and
   generating an output print data that has trapping information in addition to the input print data or in addition to data of the raster image of the first primary color.

19. A computer-readable medium according to claim 18 wherein the commands or data of the computer program are stored on a storage medium.

20. A method for preparing a print data stream for generation of print images with at least two primary colors, comprising the steps of:
   supplying the print data contained in an input print data stream to a processing stage as input print data;
   processing the input print data with a processing stage wherein at least one raster image of the first primary color is generated;
   generating trapping information by use of the raster image; and
   generating an output print data stream that has trapping information together with print data.

* * * * *